(12) United States Patent
Brockwell et al.

(10) Patent No.: US 12,371,032 B2
(45) Date of Patent: Jul. 29, 2025

(54) USER SENSORY CONTROL

(71) Applicant: GM GLOBAL TECHNOLOGY OPERATIONS LLC, Detroit, MI (US)

(72) Inventors: Eric W. Brockwell, Roswell, GA (US); Babak Makkinejad, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 133 days.

(21) Appl. No.: 18/363,965

(22) Filed: Aug. 2, 2023

(65) Prior Publication Data

US 2025/0042417 A1 Feb. 6, 2025

(51) Int. Cl.
*B60W 40/00* (2006.01)
*B60W 40/08* (2012.01)
*B60W 50/00* (2006.01)

(52) U.S. Cl.
CPC ........ *B60W 50/0098* (2013.01); *B60W 40/08* (2013.01); *B60W 2050/0083* (2013.01); *B60W 2540/22* (2013.01); *B60W 2540/221* (2020.02); *B60W 2540/227* (2020.02)

(58) Field of Classification Search
None
See application file for complete search history.

(56) References Cited

U.S. PATENT DOCUMENTS

| | | | | |
|---|---|---|---|---|
| 7,431,120 B2 * | 10/2008 | Pollehn | ................ | B60N 2/0022 180/272 |
| 8,448,739 B2 * | 5/2013 | Kolich | ................ | B60H 3/0007 180/271 |
| 10,004,873 B1 * | 6/2018 | Hur | ........ | A61B 5/6893 |
| 10,226,982 B2 * | 3/2019 | Alger | ...................... | G06V 20/56 |
| 10,287,021 B2 * | 5/2019 | Fantuzzi | ................. | A61L 9/122 |
| 10,814,701 B2 * | 10/2020 | Starke | ................... | B60H 3/0035 |
| 10,828,959 B2 * | 11/2020 | Duan | ....................... | B60H 3/00 |
| 10,913,539 B2 * | 2/2021 | Fantuzzi | ................. | B01F 25/00 |
| 10,922,567 B2 * | 2/2021 | Mahmoud | ............ | G08G 1/0129 |
| 11,279,208 B2 * | 3/2022 | Iliffe-Moon | ............ | A61L 9/012 |
| 11,414,012 B2 * | 8/2022 | Ishiko | .................... | B60K 35/10 |
| 11,436,694 B2 * | 9/2022 | Yeung | ................. | G06F 16/2379 |
| 11,527,081 B2 * | 12/2022 | Balch | .................. | G06V 20/597 |
| 11,648,817 B2 * | 5/2023 | Günzel | ............. | B60H 1/00771 701/36 |
| 11,731,486 B2 * | 8/2023 | Feldman | ............ | B60H 1/00771 701/49 |
| 11,760,169 B2 * | 9/2023 | Varughese | ........... | B60H 3/0071 454/75 |
| 11,794,554 B2 * | 10/2023 | Scheer | ................... | B60H 1/008 |
| 11,828,210 B2 * | 11/2023 | Varughese | .............. | F01N 11/00 |
| 11,875,609 B2 * | 1/2024 | Woo | ........................ | G07C 5/008 |
| 12,017,506 B2 * | 6/2024 | Varughese | ........... | B60H 3/0085 |
| 12,083,253 B2 * | 9/2024 | Duvert | .................... | A42B 3/286 |
| 2007/0041865 A1 * | 2/2007 | Ayoub | .................... | A61L 9/125 700/285 |

(Continued)

*Primary Examiner* — Jonathan M Dager

(74) *Attorney, Agent, or Firm* — CANTOR COLBURN LLP

(57) ABSTRACT

Techniques are provided for user sensory control in a bounded space. In one embodiment, the techniques involve receiving user data, generating light data based on the user data and sensory data, generating scent data based on the user data and the sensory data, and controlling a light emission or a scent emission based on a combination of the light data and the scent data.

20 Claims, 4 Drawing Sheets

(56) References Cited

U.S. PATENT DOCUMENTS

| | | | |
|---|---|---|---|
| 2010/0010956 A1* | 1/2010 | Bell | G01N 33/0034 702/22 |
| 2011/0046846 A1* | 2/2011 | Prokhorov | B60H 1/008 706/12 |
| 2015/0019024 A1* | 1/2015 | Sabripour | G05D 23/1927 700/276 |
| 2015/0032266 A1* | 1/2015 | Weast | B60H 1/00842 700/276 |
| 2015/0098860 A1* | 4/2015 | Aldereguia | G01N 33/0044 422/3 |
| 2016/0046294 A1* | 2/2016 | Lee | G08B 21/06 340/576 |
| 2016/0152117 A1* | 6/2016 | Backman | A61L 9/03 422/125 |
| 2016/0185354 A1* | 6/2016 | Lisseman | G06V 20/59 382/104 |
| 2016/0188987 A1* | 6/2016 | Lisseman | H04N 7/18 348/148 |
| 2016/0191859 A1* | 6/2016 | Lisseman | B60K 35/00 348/148 |
| 2016/0320081 A1* | 11/2016 | Nikovski | G06F 16/2228 |
| 2017/0345429 A1* | 11/2017 | Hardee | G10L 25/93 |
| 2019/0310097 A1* | 10/2019 | Makita | G08G 1/096844 |
| 2020/0039468 A1* | 2/2020 | Narumi | G08B 21/06 |
| 2020/0208867 A1* | 7/2020 | Emoto | F24F 11/0008 |
| 2020/0218271 A1* | 7/2020 | Krystek | G06F 16/285 |
| 2020/0224914 A1* | 7/2020 | Emoto | H05B 47/115 |
| 2020/0242421 A1* | 7/2020 | Sobhany | B60W 50/08 |
| 2020/0393430 A1* | 12/2020 | Onda | G01N 29/022 |
| 2021/0188049 A1* | 6/2021 | Etienne | B60Q 9/00 |
| 2021/0188051 A1* | 6/2021 | Macneille | B60H 3/0007 |
| 2021/0240277 A1* | 8/2021 | Iliffe-Moon | G06V 20/597 |
| 2021/0283988 A1* | 9/2021 | De Pelsemaeker | B60H 1/2215 |
| 2022/0024309 A1* | 1/2022 | Seo | B60W 50/14 |
| 2022/0089087 A1* | 3/2022 | Ishiko | B60K 35/28 |

* cited by examiner

USER SENSORY CONTROL

INTRODUCTION

The subject disclosure relates to sensory control, and more specifically, to controlling light emissions and scent emissions of occupants in a bounded space.

Light control systems generally use light emitting diodes (LEDs) that control a light intensity and color output across the color spectrum (e.g., the Red-Green-Blue spectrum). Scent control systems generally use a scented material (e.g., a vehicle air freshener) or a scent dispensing device (e.g., a scent diffuser) that can output a scent into spaces surrounding the material or device. However, the light control systems and scent control systems are not generally coordinated to control a user sensory experience.

SUMMARY

In one exemplary embodiment, a method is provided to control a sensory experience in a vehicle. The method includes receiving user data, generating light data based on the user data and sensory data, generating scent data based on the user data and the sensory data, and controlling a light emission or a scent emission based on a combination of the light data and the scent data.

In addition to one or more of the features described herein, the user data includes at least one of a gender, an age, a personality indicator, a medical condition, a mental health diagnosis indicator, a mood indicator, a lighting preference, or a scent preference of a user, the light data includes at least one of a light intensity, a lighting direction, a color, combination of colors, or a color temperature, the scent data includes at least one of a scent, a combination of scents, or a scent intensity, and the sensory data includes mappings between light features and scent features of the sensory experience for given user data, where the mappings are determined from empirical evidence that correlates the light data, the scent data, and characteristics of the user determined from the user data.

In addition to one or more of the features described herein, the user data includes a first user data of a first user and a second user data of a second user, the light data includes a first light data of the first user and a second light data of the second user, and the scent data includes a first scent data of the first user and a second scent data of the second user.

In addition to one or more of the features described herein, the method also involves ranking, based on the first user data and the second user data, the first light data, the first scent data, the second light data, and the second scent data.

In addition to one or more of the features described herein, upon determining that a difference between the rankings exceeds a threshold, the light emission or the scent emission is controlled based on the ranking of at least one of the first light data, the first scent data, the second light data, or the second scent data.

In addition to one or more of the features described herein, upon determining that a difference between the rankings does not exceed a threshold, the light emission or the scent emission is controlled based on a default light data and a default scent data.

In addition to one or more of the features described herein, the ranking is further based on at least one of a categorization of the user data, a risk of danger indicated by the user data, or a position of the first user or the second user within the vehicle.

In another exemplary embodiment, a system is provided to control a sensory experience in a vehicle. The system includes a processor, and memory or storage comprising an algorithm or computer instructions, which when executed by the processor, performs an operation includes receiving user data, generating light data based on the user data and sensory data, generating scent data based on the user data and the sensory data, and controlling a light emission or a scent emission based on a combination of the light data and the scent data.

In addition to one or more of the features described herein, the user data includes at least one of a gender, an age, a personality indicator, a medical condition, a mental health diagnosis indicator, a mood indicator, a lighting preference, or a scent preference of a user, the light data includes at least one of a light intensity, a lighting direction, a color, combination of colors, or a color temperature, the scent data includes at least one of a scent, a combination of scents, or a scent intensity, and the sensory data includes mappings between light features and scent features of the sensory experience for given user data, where the mappings are determined from empirical evidence that correlates the light data, the scent data, and characteristics of the user determined from the user data.

In addition to one or more of the features described herein, the user data includes a first user data of a first user and a second user data of a second user, the light data includes a first light data of the first user and a second light data of the second user, and the scent data includes a first scent data of the first user and a second scent data of the second user.

In addition to one or more of the features described herein, the operation also involves ranking, based on the first user data and the second user data, the first light data, the first scent data, the second light data, and the second scent data.

In addition to one or more of the features described herein, upon determining that a difference between the rankings exceeds a threshold, the light emission or the scent emission is controlled based on the ranking of at least one of the first light data, the first scent data, the second light data, or the second scent data.

In addition to one or more of the features described herein, upon determining that a difference between the rankings does not exceed a threshold, the light emission or the scent emission is controlled based on a default light data and a default scent data.

In addition to one or more of the features described herein, the ranking is further based on at least one of a categorization of the user data, a risk of danger indicated by the user data, or a position of the first user or the second user within the vehicle.

In yet another exemplary embodiment, a computer-readable storage medium having a computer-readable program code embodied therewith is provided to for control a sensory experience in a vehicle. The computer-readable program code is executable by one or more computer processors to perform an operation that includes receiving user data, generating light data based on the user data and sensory data, generating scent data based on the user data and the sensory data, and controlling a light emission or a scent emission based on a combination of the light data and the scent data.

In addition to one or more of the features described herein, the user data includes at least one of a gender, an age, a personality indicator, a medical condition, a mental health diagnosis indicator, a mood indicator, a lighting preference, or a scent preference of a user, the light data includes at least one of a light intensity, a lighting direction, a color, combination of colors, or a color temperature, the scent data includes at least one of a scent, a combination of scents, or a scent intensity, and the sensory data includes mappings between light features and scent features of the sensory experience for given user data, where the mappings are determined from empirical evidence that correlates the light data, the scent data, and characteristics of the user determined from the user data.

In addition to one or more of the features described herein, the user data includes a first user data of a first user and a second user data of a second user, the light data includes a first light data of the first user and a second light data of the second user, and the scent data includes a first scent data of the first user and a second scent data of the second user.

In addition to one or more of the features described herein, the operation also involves ranking, based on the first user data and the second user data, the first light data, the first scent data, the second light data, and the second scent data.

In addition to one or more of the features described herein, upon determining that a difference between the rankings exceeds a threshold, the light emission or the scent emission is controlled based on the ranking of at least one of the first light data, the first scent data, the second light data, or the second scent data.

In addition to one or more of the features described herein, upon determining that a difference between the rankings does not exceed a threshold, the light emission or the scent emission is controlled based on a default light data and a default scent data.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
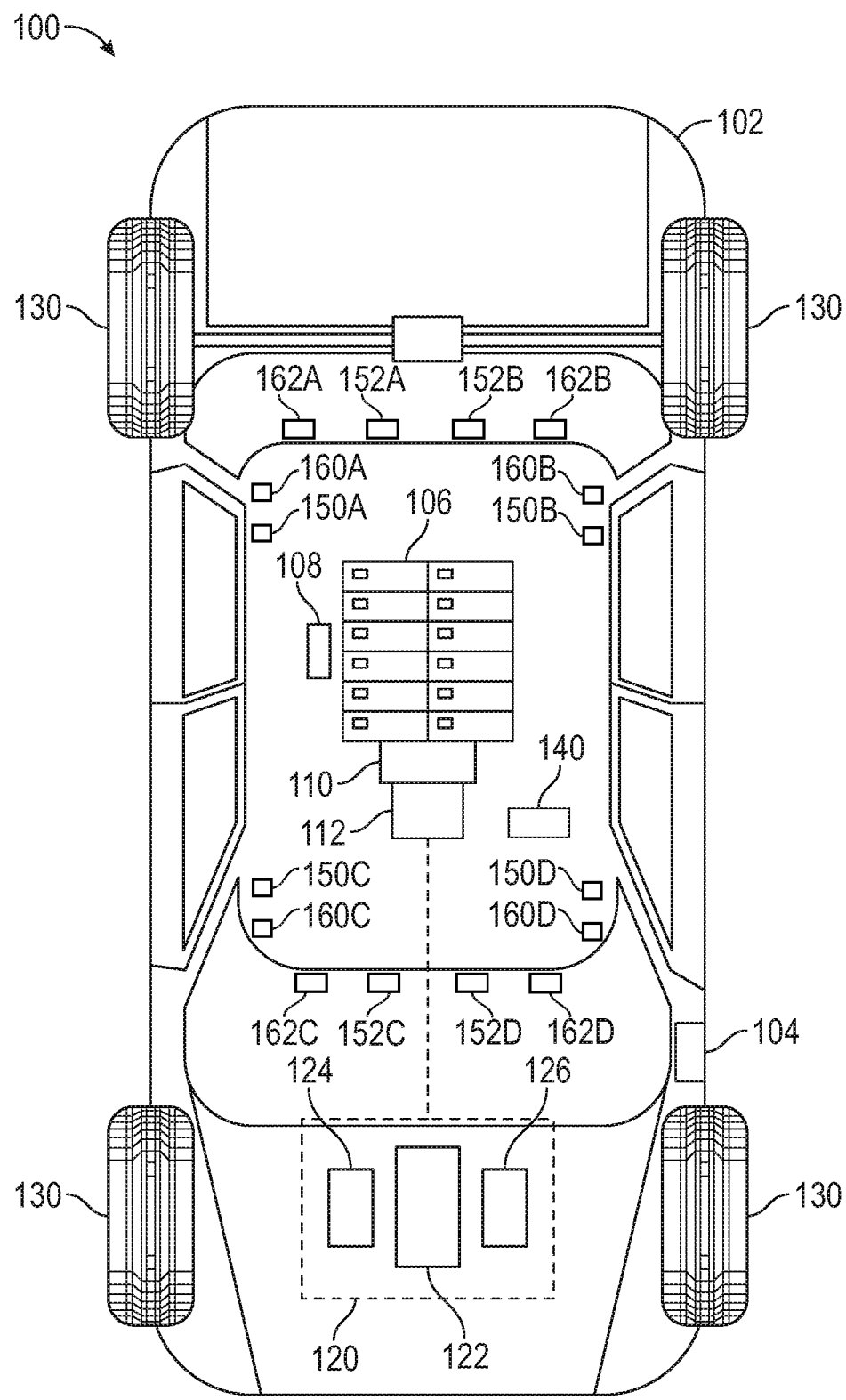
FIG. 1 illustrates a vehicle, according to an embodiment.

The following description is merely exemplary in nature and is not intended to limit the present disclosure, its application or uses. It should be understood that throughout the drawings, corresponding reference numerals indicate like or corresponding parts and features. As used herein, the term "unit" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. As used herein, the term "module" can refer to one or more algorithms, instruction sets, software applications, or other computer-readable program code that can be executed by a processor to perform the functions, operations, or processes described herein.

Embodiments of the present disclosure improve upon light control systems and scent control systems by providing a sensory control module to control a sensory experience catered to idiosyncrasies of at least one user. In one embodiment, the sensory control module leverages sensory data to determine light data and scent data to control a light emission or a scent emission based on a user input. The light data can include a light intensity, a lighting direction, a color or combination of colors, a color temperature, or the like. The scent data can include a scent intensity, a scent or a combination of scents, or the like. The user idiosyncrasies can be captured as the user input, and can include a gender, an age, a personality model, a medical condition, a mental health diagnosis indicator, a mood indicator, a lighting preference, a scent preference, or the like. The sensory data can include mappings between light features and scent features (based on empirical evidence) that can provide an optimal sensory experience for given user inputs. In one embodiment, when a sensory experience involves multiple users, the sensory control module can rank the light data and the scent data corresponding to a user input of each user, and control a light emission or a scent emission based on the ranking.

One benefit of the disclosed embodiments is to provide users with an improved sensory experience. Further, embodiments of the present disclosure can mitigate unwanted light pollution and odors that enter a bounded space of a user.

FIG. 1 illustrates a vehicle 100, according to an embodiment. The vehicle 100 includes a body 102, which can support a charge port 104, a power system 106, a sensor system 108, a propulsion system 120, a controller 140, light emitters 150A-150D, light detectors 152A-152D, scent emitters 160A-160D, scent detectors 162A-162D, and other systems of the vehicle 100 described herein.

In one embodiment, the vehicle 100 is an internal combustion engine (ICE) vehicle, an electric vehicle (EV), or a hybrid electric vehicle (HEV). In the illustrated embodiment, the vehicle 100 is an HEV that is partially powered by the power system 106, which includes multiple interconnected battery cells. The power system 106 can be charged via the charge port 104 that is connected to a power source (e.g., a grid, a charging station, another vehicle, or the like).

The power system 106 can be electrically coupled to at least one electric motor assembly of the propulsion system 120. In one embodiment, the power system 106 is electrically coupled to a direct current (DC) converter unit 110 (e.g., a DC-DC converter) and an inverter unit 112 (e.g., a traction power inversion unit). The inverter module 112 can include multiple inverters that convert DC signals from the power system 106 to three-phase alternating current (AC) signals to drive electric motors of the propulsion system 120. The power system 106 can also be electrically coupled to vehicle electronics systems such as audio systems, display systems, navigation systems, temperature control systems, or the like.

The sensor system 108 includes a variety of sensors disposed on, or integrated with, various components of the vehicle 100. In one embodiment, the sensor system 108 is communicatively coupled to the controller 140 to transfer measurements of the power system 106 to the controller 140.

The sensor system 108 may include a current sensor, a voltage sensor, a temperature sensor, or the like.

The propulsion system 120 can include an ICE system 122 and at least one electric motor assembly (e.g., a first electric motor 124 and a second electric motor 126). Each component of the propulsion system 120 can be configured to drive at least one the wheels 130 of the vehicle 100 via a transmission system coupled to a front axle shaft or a rear axle shaft, which are coupled to a respective front and rear set of the wheels 130.

Although illustrated as separate components, the light emitters 150A-150D, the light detectors 152A-152D, the scent emitters 160A-160D, and the scent detectors 162A-162D may include a greater or fewer number of units of detectors and emitters, and may be integrated into a single unit, grouped into combinations of units, or separated into individual units.

The light emitters 150A-150D can include light emitting diodes (LEDs), neon lights, LED strips, light bars, or the like. In one embodiment, the light emitters 150A-150D are configured to output light across a color spectrum at various positions within the vehicle 100. Colors of the color spectrum may be produced using color models such as a Red-Green-Blue (RGB) model, a Cyan-Magenta-Yellow-Black (CMYK) model, a Munsell Color Ellipsoid model (MCE), or the like.

The light detectors 152A-152D can include photodiodes, phototransistors, color sensors, color filters, or the like. In one embodiment, light signals measured by the light detectors 152A-152D can be associated with colors based on wavelengths or frequencies of the light signals. Further, the color filters can be applied to the photodiodes or phototransistors to absorb or reflect specific wavelength ranges, which may be used to determine colors associated with the measured light signals.

The scent emitters 160A-160D can include electric scent diffusers, heat-based scent emitters, air fresheners, scent machines, or the like. In one embodiment, the scent emitters 160A-160D are configured to output scents at various positions within the vehicle 100.

The scent detectors 162A-162D can include electrical sensors and a scent-sensitive material that changes electrical properties based on the presence of a target scent. The scent-sensitive material can include a metal-oxide semiconductor, a conductive polymer or polymer composite, a surface acoustic wave (SAW) system, a mini-spectrometer, or the like.

In one embodiment, the controller 140 is configured to control the light emitters 150A-150D, the light detectors 152A-152D, the scent emitters 160A-160D, and the scent detectors 162A-162D to provide a sensory experience to a user (e.g., a vehicle occupant or an occupant of any bounded space). The controller is discussed further in FIGS. 2-4. Techniques used to provide a sensory experience to a first user are discussed in FIG. 3. Techniques used to provide a sensory experience to multiple users are discussed in FIG. 4.

Figure 2:
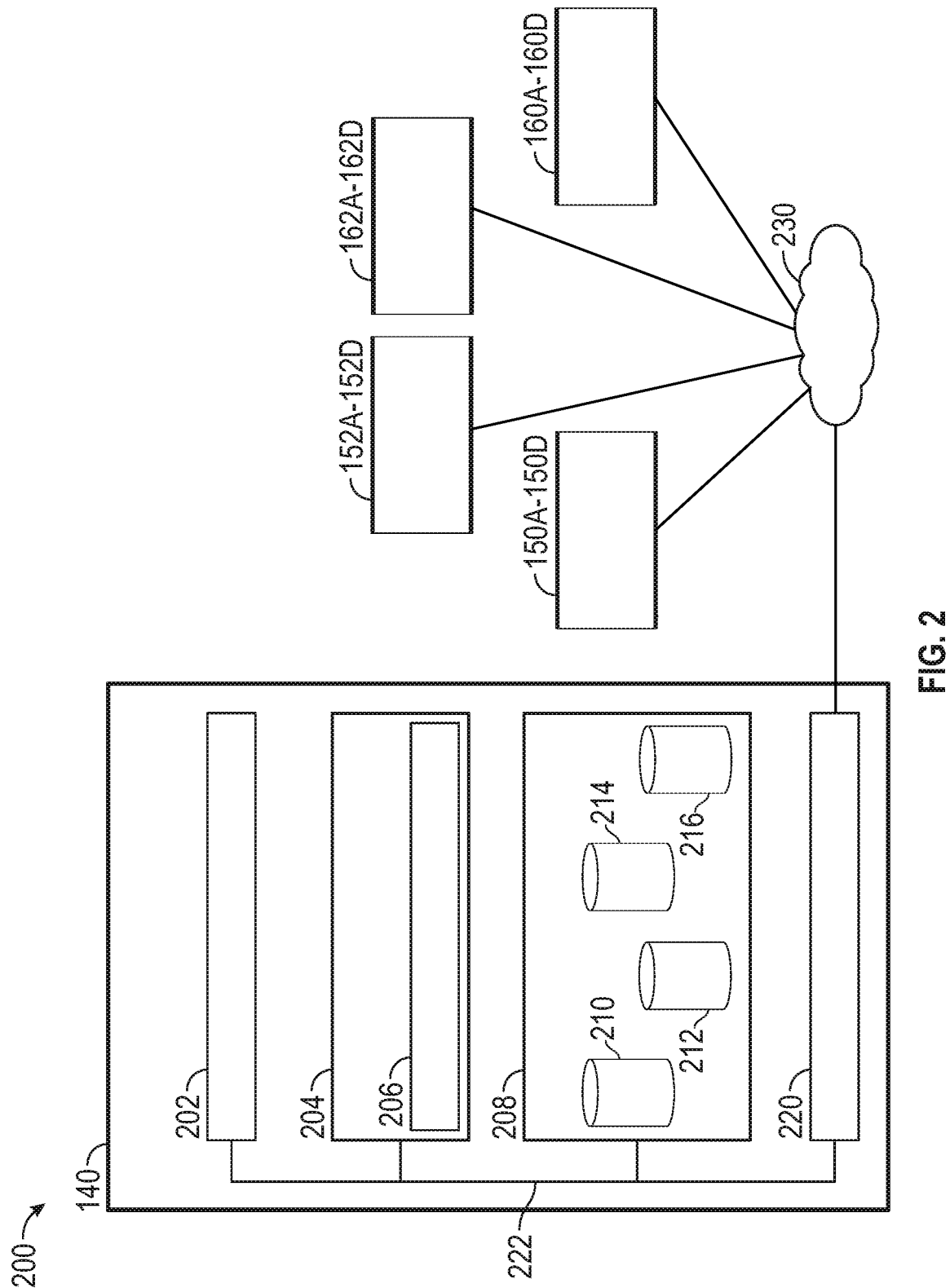
FIG. 2 illustrates a computing environment, according to an embodiment.

FIG. 2 illustrates a computing environment 200, according to an embodiment. In the illustrated embodiment, the computing environment 200 includes a controller 140, a network 230, light emitters 150A-150D, light detectors 152A-152D, scent emitters 160A-160D, and scent detectors 162A-162D.

In one embodiment, the controller 140 includes a processor 202 that obtains instructions and data via a bus 222 from a memory 204 or storage 208. Not all components of the controller 140 are shown. The controller 140 is generally under the control of an operating system (OS) suitable to perform or support the functions or processes disclosed herein. The processor 202 is a programmable logic device that performs instruction, logic, and mathematical processing, and may be representative of one or more CPUs. The processor may execute one or more algorithms, instruction sets, or applications in the memory 204 or storage 208 to perform the functions or processes described herein.

The memory 204 and storage 208 can be representative of hard-disk drives, solid state drives, flash memory devices, optical media, and the like. The storage 208 can also include structured storage (e.g., a database). In addition, the memory 204 and storage 208 may be considered to include memory physically located elsewhere. For example, the memory 204 and storage 208 may be physically located on another computer communicatively coupled to the controller 140 via the bus 222 or the network 230.

The controller 140 can be connected to other computers (e.g., controllers, distributed databases, servers, or web-hosts), the light emitters 150A-150D, the light detectors 152A-152D, the scent emitters 160A-160D, and the scent detectors 162A-162D via a network interface 220 and the network 230. Examples of the network 230 include a controller area network (CAN), a transmission control protocol (TCP) bus, electrical busses, physical transmission cables, optical transmission fibers, wireless transmissions mediums, routers, firewalls, switches, gateway computers, edge servers, a local area network, a wide area network, a wireless network, or the like. The network interface 220 may be any type of network communications device allowing the controller 140 to communicate with computers and other components of the computing environment 200 via the network 230.

In the illustrated embodiment, the memory 204 includes a sensory control module 206. In one embodiment, the sensory control module 206 represents one or more algorithms, instruction sets, software applications, or other computer-readable program code that can be executed by the processor 202 to perform the functions, operations, or processes described herein.

In one embodiment, the sensory control module 206 receives information of a user from an electronic device (e.g., a computer or a mobile device), and stores the information as user data 212. The sensory control module 206 can use the user data 212 and sensory data 210 to generate light data 214 and scent data 216. The sensory control module 206 can then control light emissions and scent emissions using the light emitters 150A-150D, the light detectors 152A-152D, the scent emitters 160A-160D, and the scent detectors 162A-162D. Operation of the sensory control module 206 is described further in FIGS. 3-4 herein.

Figure 3:
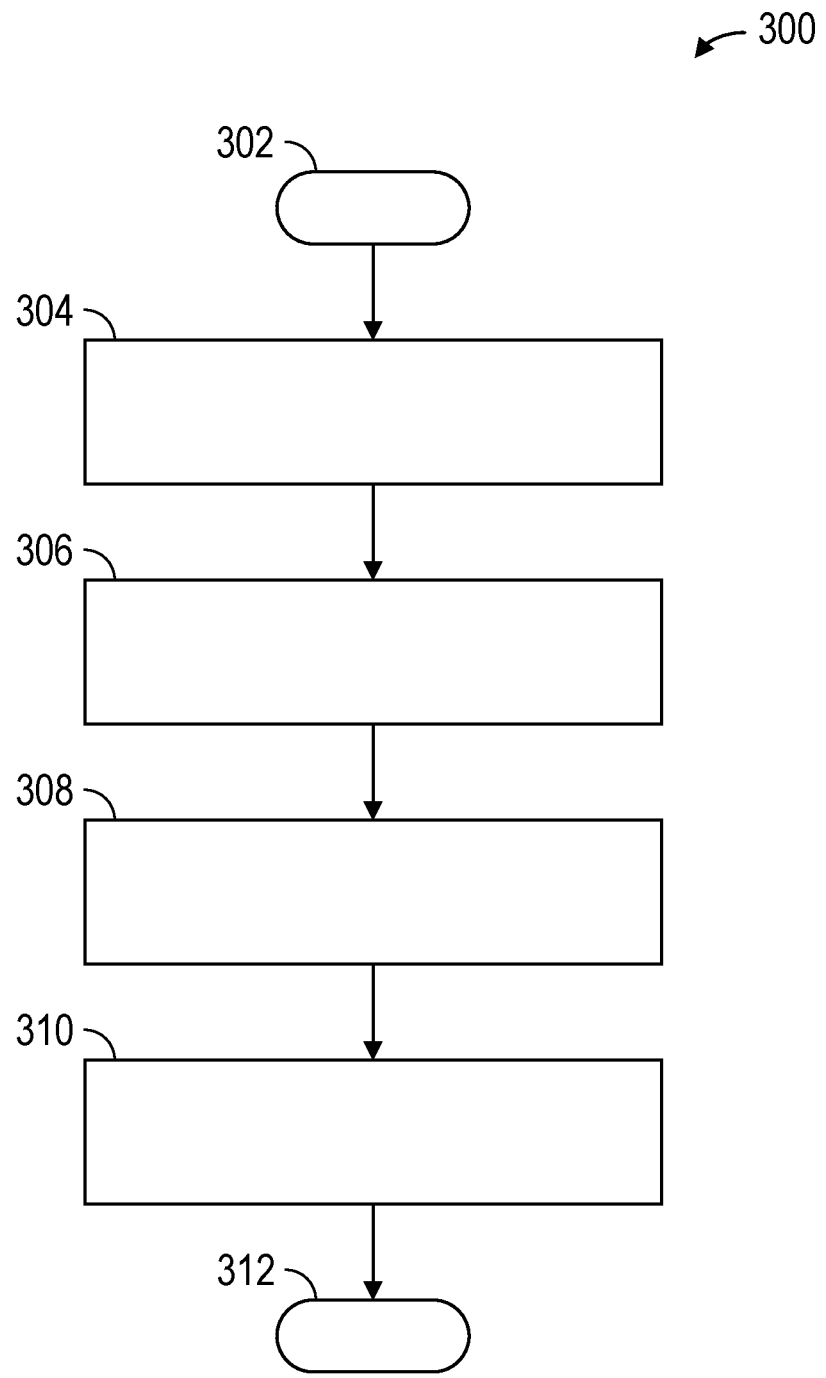
FIG. 3 illustrates a flowchart of a method of controlling a sensory experience of one user, according to an embodiment.

FIG. 3 illustrates a flowchart of a method 300 of controlling a sensory experience of one user, according to an embodiment. The method 300 begins at block 302.

At block 304, the sensory control module 206 receives user data 212. In one embodiment, a user influences the control of the sensory experience by inputting user information into an electronic device. For instance, the user inputs the user information via a user profile, a setup assistant, a survey, a questionnaire, or the like, of a software application of the electronic device.

The information input by the user may include a gender, an age, a personality indicator, a medical condition, a mental health diagnosis indicator, a mood indicator, a lighting preference, a scent preference, or the like, of the user. In one embodiment, the input information is stored as user data 212.

At block 306, the sensory control module 206 generates light data 214 based on the user data 212 and sensory data 210. At block 308, the sensory control module 206 generates scent data 216 based on the user data 212 and the sensory data 210.

The light data 214 can include a light intensity, a lighting direction, a color or combination of colors, a color temperature, or the like. The scent data 216 can include a scent intensity, a scent or a combination of scents, or the like.

The sensory data 210 can include mappings between light features and scent features (based on empirical evidence) that can provide an optimal sensory experience for given user inputs. Put differently, each mapping of the sensory data 210 can represent a predetermined relationship between a user input, light data 214, and scent data 216, where the relationship is determined from empirical evidence.

For instance, the empirical evidence may be determined from an academic study that shows a light intensity preference, color preference, and combination of scents for users of a given age range and medical condition. The empirical evidence may also be determined, for instance, from market data that shows that in-store shoppers exhibit mood indicators of happiness and are more likely to purchase items if the shoppers are of a given gender and personality type indicator, and are exposed to a faint single note scent and a specific store color scheme. Hence, when the sensory control module 260 receives such user information, the sensory control module 260 can generate light data 214 and scent data 216 in accordance with the mappings of the sensory data 210 (which represents the empirical relationships) to the user input information.

In one embodiment, because the empirical evidence and relationships are predetermined, the user input information of lighting preference and scent preference may provide a better sensory experience when used without modification. Thus, in one embodiment, the sensory control module 206 uses the lighting preference as the light data 214, and the scent preference as the scent data 216.

At block 310, the sensory control module 206 controls a light emission or a scent emission based on a combination of the light data 214 and the scent data 216. In one embodiment, the sensory control module 206 emits, and corrects emissions of, lights via the light emitters 150A-150D and the light detectors 152A-152D, and scents via the scent emitters 160A-160D and the scent detectors 162A-162D, to control a sensory experience of the user.

In one embodiment, the sensory control module 206 can further control the light emission or the scent emission to counter smells that encroach on the bounded space of the user. For example, when in motion, the vehicle 100 may be subject to noxious smells from a paper mill. In such circumstances, the sensory control module 206 may increase the scent emission, or substitute the scent data 216 to change the scent emission, in order to minimize or eliminate the smell from the paper mills that reach the inside of the vehicle 100.

In one embodiment, the sensory control module 206 includes a machine learning algorithm that receives feedback from the user regarding the sensory experience. The sensory control module 206 can use the feedback to updates weights associated with the mappings of the sensory data 210 to train the model to generate light data 214 and scent data 216 for an improved sensory experience of a future user. The method 300 ends at block 312.

Figure 4:
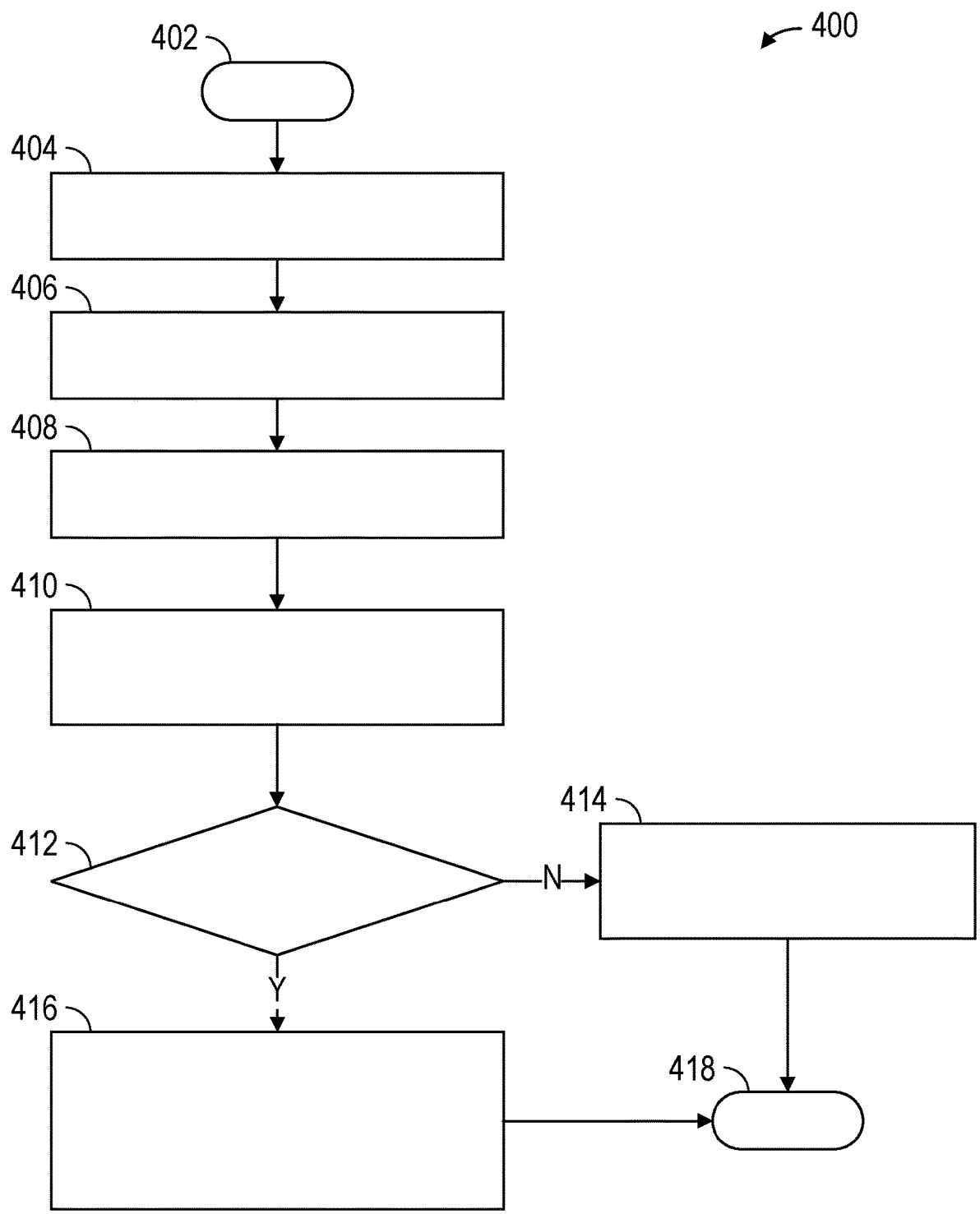
FIG. 4 illustrates a flowchart of a method of controlling a sensory experience of multiple users, according to an embodiment.

FIG. 4 illustrates a flowchart of a method 400 of controlling a sensory experience of multiple users, according to an embodiment. The method 400 begins at block 402.

At block 404, the sensory control module 206 receives user data 212. In one embodiment, the user data 212 includes user input information of a first user, and user input information of a second user. As previously discussed, the information input by a user may include a gender, an age, a personality indicator, a medical condition, a mental health diagnosis indicator, a mood indicator, a lighting preference, a scent preference, or the like, of the user.

At block 406, the sensory control module 206 generates light data 214 based on the user data 212 and sensory data 210. At block 408, the sensory control module 206 generates scent data 216 based on the user data 212 and the sensory data 210.

In one embodiment, the light data 214 includes a first light data of the first user, and a second light data of the second user. The scent data 216 can include a first scent data of the first user, and a second scent data of the second user.

As previously discussed, the light data 214 can include a light intensity, a lighting direction, a color or combination of colors, a color temperature, or the like. The scent data 216 can include a scent intensity, a scent or a combination of scents, or the like. The sensory data 210 can include mappings between light features and scent features (based on empirical evidence) that can provide an optimal sensory experience for given user inputs. Put differently, each mapping of the sensory data 210 can represent a predetermined relationship between a user input, light data 214, and scent data 216, where the relationship is determined from empirical evidence. In one embodiment, the sensory control module 206 generates the light data 214 and the scent data 216 using a process similar to the process discussed in FIG. 3.

At block 410, the sensory control module 206 ranks the first light data, the first scent data, the second light data, and the second scent data based on the first user data and the second user data. For instance, the sensory control module 206 may rank the first light data, the first scent data, the second light data, and the second scent data in ascending order of priority from 10-1, where 10 represents a lowest rank and 1 represents a highest rank.

In one embodiment, the sensory control module 206 ranks the user data 212 based on a categorization of user information. For example, the sensory control module may rank the user data 212 in order of (highest ranked to lowest ranked): a medical condition, a mental health diagnosis indication, a lighting or scent preference, an age, and a gender or a personality indicator or a mood indicator. The sensory control module 206 can then prioritize at least one of the higher ranked light data 214 and scent data 216 of the first user or the second user when generating a sensory experience.

In one embodiment, the sensory control module 206 ranks the user data 212 according to a risk of danger indicated by the first user data and the second user data. For example, assuming that the information of the first user includes a medical condition (e.g., Asperger syndrome) and the information of the second user includes an age and a personality type indicator, the sensory control module 206 may rank at least one of the first light data or the first scent data higher than the second light data or the second scent data. Therefore, the sensory control module 206 may prioritize the higher ranked user data of the first user, and cater corresponding light features or scent features of the sensory experience towards the first user.

In one embodiment, when the rankings are applied within the same categorization of user information, the sensory control module 206 further ranks the user data 212 according to a risk of danger indicated by the first user data and the second user data. For example, assuming that the information of the first user includes a medical condition (e.g., Epilepsy) and the information of the second user includes a different medical condition (e.g., Asperger syndrome), the sensory control module 206 may rank at least one of the first light data or the first scent data higher than the second light data or the second scent data, since lights and scents can trigger an Epileptic seizure. Therefore, the sensory control module 206 can prioritize the higher ranked user data of the first user, and cater corresponding light features or scent features of the sensory experience towards the first user.

The sensory control module 206 can also adjust the ranking based on the positions or locations of the users when ranking the user data 212. For instance, the sensory control module 206 can consider whether a user of the vehicle 100 occupies a seat of a driver or a passenger. In one embodiment, the ranking of user data 212 of a user in the seat of a driver is increased relative to the ranking of user data 212 of a user in the seat of a passenger.

At block 412, the sensory control module 206 determines whether a difference between the ranking of user data of the first user and user data of the second user (e.g., between a ranking of the first light data and a ranking of the second light data, or between a ranking of the first scent data and a ranking of the second scent data) exceeds a ranking threshold. In one embodiment, the ranking threshold represents a predetermined value that indicates when the rankings justify using ranked light data and ranked scent data over a default light data and default scent data.

Upon determining that the difference does not exceed the ranking threshold, the method 400 proceeds to block 414, where the sensory control module 206 controls a light emission or a scent emission based on a default light data and a default scent data. In one embodiment, the default light data and default scent data represent a commonly favored lighting feature and scent feature in bounded spaces as determined from empirical evidence of the sensory data 210.

However, upon determining that the difference between the ranking of the user data of the first user and user data of the second user exceeds the ranking threshold, the method 400 proceeds to block 416. At block 416, the sensory control module 206 controls a light emission or a scent emission based on the ranking of at least one of: the first light data, the first scent data, the second light data, and the second scent data. In this manner, the sensory control module can generate a sensory experience for the users of a bounded space (e.g., the vehicle 100).

In one embodiment, the sensory experience is common to all users of the bounded space. For example, the sensory control module 206 can provide a sensory experience that includes a first light emission and a first scent emission at each of the light emitters 150A-150D and scent emitters 160A-160D.

In another embodiment, the sensory experience is specific to each user. For example, the sensory control module 206 can provide a sensory experience to the first user that includes a first light emission and excludes scent emissions, while providing a sensory experience to the second user that includes a second light emission and excludes scent emissions. Further, in one embodiment, the sensory control module 206 can emit different lighting and scents from the light emitters 150A-150D and scent emitters 160A-160D such that the lighting and scents are blended or mixed to create complimentary sensory experiences for multiple users. The method 400 ends at block 418.

The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made, and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for controlling a sensory experience in a vehicle, comprising:
   receiving user data, wherein the user data includes a first user data of a first user and a second user data of a second user;
   receiving sensory data from at least one in vehicle sensor;
   generating light data based on the user data and sensory data, wherein the light data includes a first light data of the first user and a second light data of the second user;
   generating scent data based on the user data and the sensory data wherein the scent data includes a first scent data of the first user and a second scent data of the second user;
   ranking, based on the first user data and the second user data, the first light data, the first scent data, the second light data, and the second scent data, wherein the ranking is further based on at least one of: a categorization of the user data, a risk of danger indicated by the user data, or a position of the first user or the second user within the vehicle; and
   controlling a light emission or a scent emission based on a combination of the light data and the scent data.

2. The method of claim 1, wherein the user data includes at least one of: a gender, an age, a personality indicator, a medical condition, a mental health diagnosis indicator, a mood indicator, a lighting preference, or a scent preference of a user;
   wherein the light data includes at least one of: a light intensity, a lighting direction, a color, combination of colors, or a color temperature;

wherein the scent data includes at least one of: a scent, a combination of scents, or a scent intensity; and wherein the sensory data includes mappings between light features and scent features of the sensory experience for given user data, wherein the mappings are determined from empirical evidence that correlates the light data, the scent data, and characteristics of the user determined from the user data.

3. The method of claim 1 wherein upon determining that a difference between the rankings exceeds a threshold, the light emission or the scent emission is controlled based on the ranking of at least one of: the first light data, the first scent data, the second light data, or the second scent data.

4. The method of claim 1, wherein upon determining that a difference between the rankings does not exceed a threshold, the light emission or the scent emission is controlled based on a default light data and a default scent data.

5. A system for controlling a sensory experience in a vehicle, comprising:
   a processor; and
   memory or storage comprising an algorithm or computer instructions, which when executed by the processor, performs an operation comprising:
     receiving user data;
     receiving sensory data from at least one in vehicle sensor;
     generating light data based on the user data and sensory data;
     generating scent data based on the user data and the sensory data;
     ranking, based on the first user data and the second user data, the first light data, the first scent data, the second light data, and the second scent data; and
     controlling a light emission or a scent emission based on a combination of the light data and the scent data, wherein upon determining that a difference between the rankings exceeds a threshold, the light emission or the scent emission is controlled based on the ranking of at least one of: the first light data, the first scent data, the second light data, or the second scent data.

6. The system of claim 5, wherein the user data includes at least one of: a gender, an age, a personality indicator, a medical condition, a mental health diagnosis indicator, a mood indicator, a lighting preference, or a scent preference of a user;
   wherein the light data includes at least one of: a light intensity, a lighting direction, a color, combination of colors, or a color temperature;
   wherein the scent data includes at least one of: a scent, a combination of scents, or a scent intensity; and
   wherein the sensory data includes mappings between light features and scent features of the sensory experience for given user data, wherein the mappings are determined from empirical evidence that correlates the light data, the scent data, and characteristics of the user determined from the user data.

7. The system of claim 5, wherein the user data includes a first user data of a first user and a second user data of a second user;
   wherein the light data includes a first light data of the first user and a second light data of the second user; and
   wherein the scent data includes a first scent data of the first user and a second scent data of the second user.

8. The system of claim 5, wherein upon determining that a difference between the rankings does not exceed a threshold, the light emission or the scent emission is controlled based on a default light data and a default scent data.

9. The system of claim 5, wherein the ranking is further based on at least one of: a categorization of the user data, a risk of danger indicated by the user data, or a position of the first user or the second user within the vehicle.

10. A computer-readable storage medium having a computer-readable program code embodied therewith, the computer-readable program code executable by one or more computer processors to perform an operation for controlling a sensory experience in a vehicle, the operation comprising:
    receiving user data, wherein the user data includes a first user data of a first user and a second user data of a second user;
    receiving sensory data from at least one in vehicle sensor;
    generating light data based on the user data and sensory data, wherein the light data includes a first light data of the first user and a second light data of the second user;
    generating scent data based on the user data and the sensory data wherein the scent data includes a first scent data of the first user and a second scent data of the second user;
    ranking, based on the first user data and the second user data, the first light data, the first scent data, the second light data, and the second scent data; and
    controlling a light emission or a scent emission based on a combination of the light data and the scent data, wherein upon determining that a difference between the rankings does not exceed a threshold, the light emission or the scent emission is controlled based on a default light data and a default scent data.

11. The computer-readable storage medium of claim 10, wherein the user data includes at least one of: a gender, an age, a personality indicator, a medical condition, a mental health diagnosis indicator, a mood indicator, a lighting preference, or a scent preference of a user;
    wherein the light data includes at least one of: a light intensity, a lighting direction, a color, combination of colors, or a color temperature;
    wherein the scent data includes at least one of: a scent, a combination of scents, or a scent intensity; and
    wherein the sensory data includes mappings between light features and scent features of the sensory experience for given user data, wherein the mappings are determined from empirical evidence that correlates the light data, the scent data, and characteristics of the user determined from the user data.

12. The computer-readable storage medium of claim 10, wherein upon determining that a difference between the rankings exceeds a threshold, the light emission or the scent emission is controlled based on the ranking of at least one of: the first light data, the first scent data, the second light data, or the second scent data.

13. The method of claim 1, wherein the at least one in vehicle sensor includes at least one light detector.

14. The method of claim 1, wherein the at least one in vehicle sensor includes at least one scent detector.

15. The method of claim 1, wherein the user data includes data input by at least one user via at least one of a user profile, a setup assistant, a survey, and a questionnaire.

16. The system of claim 5, wherein the at least one in vehicle sensor includes at least one light detector.

17. The system of claim 5, wherein the at least one in vehicle sensor includes at least one scent detector.

18. The computer-readable storage medium of claim 10, wherein the at least one in vehicle sensor includes at least one light detector.

19. The computer-readable storage medium of claim 10, wherein the at least one in vehicle sensor includes at least one scent detector.

20. The computer-readable storage medium of claim 10, wherein the user data includes data input by at least one user via at least one of a user profile, a setup assistant, a survey, and a questionnaire.

* * * * *